(12) United States Patent
Luo et al.

(10) Patent No.: US 11,621,416 B2
(45) Date of Patent: Apr. 4, 2023

(54) CATHODE MATERIAL

(71) Applicant: CSIR, Pretoria (ZA)

(72) Inventors: Hongze Luo, Pretoria (ZA); Nomasonto Rapulenyane, Pretoria (ZA); Bonani Seteni, Pretoria (ZA); Mkhulu Mathe, Pretoria (ZA)

(73) Assignee: CSIR CAMPUS, Pretoria (ZA)

( * ) Notice: Subject to any disclaimer, the term of this patent is extended or adjusted under 35 U.S.C. 154(b) by 140 days.

(21) Appl. No.: 16/754,670

(22) PCT Filed: Sep. 27, 2018

(86) PCT No.: PCT/IB2018/057496
§ 371 (c)(1),
(2) Date: Apr. 8, 2020

(87) PCT Pub. No.: WO2019/073328
PCT Pub. Date: Apr. 18, 2019

(65) Prior Publication Data
US 2020/0259175 A1    Aug. 13, 2020

(30) Foreign Application Priority Data
Oct. 9, 2017   (ZA) ................................. 2017/06772

(51) Int. Cl.
*H01M 4/505*     (2010.01)
*H01M 10/0525*   (2010.01)
*H01M 4/04*      (2006.01)

(52) U.S. Cl.
CPC ......... *H01M 4/505* (2013.01); *H01M 4/0471* (2013.01); *H01M 4/0497* (2013.01); *H01M 10/0525* (2013.01)

(58) Field of Classification Search
CPC .. H01M 4/505; H01M 4/0471; H01M 4/0497; H01M 10/0525
See application file for complete search history.

(56) References Cited

U.S. PATENT DOCUMENTS

| 2012/0282522 A1 | 11/2012 | Axelbaum et al. |
| 2017/0092949 A1 | 3/2017  | Dai et al. |
| 2017/0104212 A1 | 4/2017  | Tong et al. |

FOREIGN PATENT DOCUMENTS

| CN | 101355159 A | 1/2009 |
| CN | 102664255 A | 9/2012 |

(Continued)

OTHER PUBLICATIONS

English language Abstract of CN104617289B.

(Continued)

*Primary Examiner* — James Lee
(74) *Attorney, Agent, or Firm* — Ware, Fressola, Maguire & Barber LLP

(57) ABSTRACT

A process for producing a lithium-manganese-rich layered oxide cathode material or a lithium-manganese-rich layered oxide cathode material precursor includes co-precipitating a dissolved Li compound and a dissolved Mn salt selected from the group consisting of $Mn(CH_3COO)_2$, $Mn(NO_3)_2$, $MnSO_4$, and mixtures thereof, from an aqueous solution, in the presence of a precipitator which reacts at least with the dissolved Mn salt to form a carbonate, thereby providing a precipitate which includes $MnCO_3$ and a lithium compound as a lithium-manganese-rich layered oxide cathode material precursor. The invention extends to a lithium-manganese-rich layered oxide cathode material or a lithium-manganese-rich layered oxide cathode material precursor, to an electrochemical cell, and to methods of making and operating an electrochemical cell.

8 Claims, 2 Drawing Sheets

(56) References Cited

FOREIGN PATENT DOCUMENTS

Figure 1:
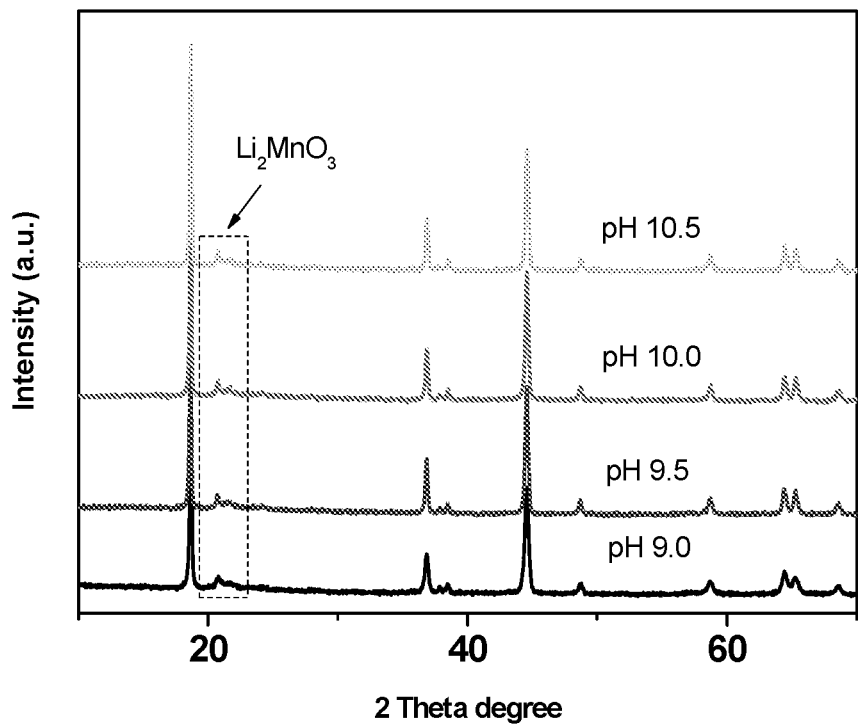

| | | | |
|---|---|---|---|
| CN | 104157835 | A | 11/2014 |
| CN | 104167533 | A | 11/2014 |
| CN | 104157831 | B | 8/2016 |
| CN | 106169566 | A | 11/2016 |
| CN | 106252650 | A | 12/2016 |
| CN | 106328908 | A | 1/2017 |
| CN | 104617289 | B | 2/2017 |
| JP | 2000281348 | A | 10/2000 |
| KR | 20110116622 | A | 10/2011 |

OTHER PUBLICATIONS

English language Abstract of CN104157831B.
Yu Li, et al., "Hierarchical Mesoporous Lithium-Rich Li [Li 0.2 Ni 0.2 Mn 0.6] O 2 Cathode Material Synthesized via Ice Templating for Lithium-Ion Battery", ACS applied materials & interfaces, XP055523156, US, ISSN: 1944-8244, DOI: 10.1021/acsami. 6b04687, vol. 8, No. 29, pp. 18832-18840, Jul. 27, 2016.
English language Abstract of JP2000281348A.
Lin-sen Zhang, et al; Characterization of Li-rich cathode material Li Mn Ni O synthesized by modified co-precipation methode; Feb. 20, 2016; Abstract; pp. 256-258.
English language Abstract of CN106252650.
English language Abstract of CN101355159.
English language Abstract of CN106328908.
English language Abstract of CN102664255.
English language Abstract of CN104157835.
English language Abstract of CN104167533.
English language Abstract of KR20110116622.
English language Abstract of CN106169566.

CATHODE MATERIAL

THIS INVENTION relates to a cathode material. In particular, the invention relates to a process for producing a lithium-manganese-rich layered oxide cathode material or a lithium-manganese-rich layered oxide cathode material precursor, to a lithium-manganese-rich layered oxide cathode material or a lithium-manganese-rich layered oxide cathode material precursor when produced by the process, to an electrochemical cell, to a method of making an electrochemical cell and to a method of operating an electrochemical cell.

Layered lithium-manganese-rich metal oxide composites have been promising candidates as cathode materials to achieve higher capacities (>200 mAh/g), voltage stabilities and good cycle life in order to provide the necessary power requirements for a broad spectrum of applications including but not limited to electric vehicles and hybrid electric vehicles. The operating voltage window of these materials has been shown to be within the high range of 2.0 V-4.8 V. Nonetheless, lithium-manganese-rich layered oxide materials such as lithium-manganese-rich layered transition metal oxide composites have a complex structure with inherent shortcomings which include large initial irreversible charge capacity, capacity fade upon prolonged cycling, poor continuous charge and discharge rate capability and high reactivity with an electrolyte at high voltages.

The general chemical formula of lithium-manganese-rich metal oxides can be presented as $xLi_2MnO_3(1-x)LiMO_2$ where M=Mn, Ni, Co and x is between 0 and 1. The synthesis method adopted, e.g. by the Argonne National Laboratory of Lemont, Ill., USA (see U.S. Pat. No. 8,492,030), as the most promising process for large-scale production of lithium-manganese-rich metal oxide materials via carbonate precursors or hydroxide precursors comprises the combination of co-precipitation and a solid-state route. For example, to prepare $Li_{1.2}Mn_{0.6}Ni_{0.2}O_2$, a $Ni_{0.25}Mn_{0.75}CO_3$ precursor is first produced via co-precipitation from a slurry containing nickel and manganese carbonate precursors using $Na_2CO_3$ as a precipitator, with the slurry being left to age for a considerable period of time before it goes through filtration to provide a filter cake, followed by drying of the filter cake and mixing of the dried powder material with $Li_2CO_3$ to produce a final $Li_{1.2}Mn_{0.6}Ni_{0.2}O_2$ product via a solid state heating method. This co-precipitation method is being used by industry to prepare the precursors for commercial production of $Li[Ni_{1/3}Co_{1/3}Mn_{1/3}]O_2$, lithium rich layered cathode oxides and the spinel oxide $LiNi_{0.5}Mn_{1.5}O_4$, $Li_{1.05}M_{0.05}Mn_{1.9}O_4$. The same method has been previously employed to synthesize $Li[Li_{0.2}Mn_{0.6}Ni_{0.2}]O_2$ cathode material via an intermediate $Mn_{0.75}Ni_{0.25}(OH)_2$ precursor. However this method involves various extensive washing and drying steps leading to the final $Li[Li_{0.2}Mn_{0.6}Ni_{0.2}]O_2$. The $Mn_{0.75}Ni_{0.25}(OH)_2$ hydroxide precursor intermediate has to be characterized by SEM and XRD to confirm formation before proceeding to the lithiation process to produce $Li[Li_{0.2}Mn_{0.6}Ni_{0.2}]O_2$. In general, the commercially adopted method for preparing lithium-manganese-rich cathode material, as described above, has drawbacks including that it is time consuming (it can take up to 72 hours) and involves multiple steps which may not be viable for full scale commercialisation of these materials.

A process or method for producing a lithium-manganese-rich layered oxide cathode material or a lithium-manganese-rich layered oxide cathode material precursor that addresses at least some of the drawbacks of currently used processes would be advantageous. In particular, a less time-consuming synthesis process producing a lithium-manganese-rich layered oxide cathode material that promises the same or better battery performance than lithium-manganese-rich layered oxide cathode material produced by current processes, in particular the Argonne National Laboratory process, would be desirable.

According to one aspect of the invention, there is provided a process for producing a lithium-manganese-rich layered oxide cathode material or a lithium-manganese-rich layered oxide cathode material precursor, the process including co-precipitating a dissolved Li compound and a dissolved Mn salt selected from the group consisting of $Mn(CH_3COO)_2$, $Mn(NO_3)_2$, $MnSO_4$, and mixtures thereof, from an aqueous solution, in the presence of a precipitator which reacts at least with the dissolved Mn salt to form a carbonate, thereby providing a precipitate which includes $MnCO_3$ and a lithium compound as a lithium-manganese-rich layered oxide cathode material precursor.

The process typically includes
calcining the precipitate to convert any carbonate material to oxide material, thereby providing a calcined material; and
annealing the calcined material to provide a lithium-manganese-rich layered oxide cathode material.

The Mn salt is thus typically a Mn(II) salt.

The precipitator which reacts at least with the dissolved Mn salt to form a carbonate may be selected from the group consisting of urea, $(NH_4)_2CO_3$, $NH_4HCO_3$, and mixtures thereof.

Preferably, the precipitator which reacts at least with the dissolved Mn salt to form a carbonate is urea.

Preferably, the aqueous solution also includes at least one further dissolved salt of a metal M, where the salt is selected from the group consisting of an acetate, a nitrate, a sulfate, and mixtures thereof.

The metal M may be selected from the group consisting of Ni, Co, Fe, Al, Mg, Ti, and two or more of these.

The dissolved Li compound may be a dissolved Li salt, where the Li salt is selected from the group consisting of $Li(CH_3COO)$, $LiNO_3$, $LiCl$, and mixtures thereof, which in the presence of the precipitator which reacts at least with the Mn salt to form a carbonate, leads to the formation and co-precipitation of $Li_2CO_3$ and $MnCO_3$, and carbonates of any metal M other than Li or Mn that may be present in the aqueous solution.

Instead, the dissolved lithium compound may be LiOH.

The precipitate, which includes $MnCO_3$ and a lithium compound, as a lithium-manganese-rich layered oxide cathode material precursor, may thus include $MnCO_3$, LiOH, and carbonates of other metals M, such as one or more of Ni, Co, Fe and Al.

LiOH is less expensive than $Li(CH_3COO)$ and is believed to provide a better yield than $Li(CH_3COO)$. In at least one embodiment of the process of the invention, LiOH is thus preferred over $Li(CH_3COO)$.

The co-precipitation may be effected at an elevated precipitation temperature for the aqueous solution from about room temperature to about 100° C., preferably between about 60° C. and about 80° C., e.g. about 70° C.

Typically, the co-precipitation is effected with agitation of the aqueous solution, so that a suspension is formed.

The precipitate, as a lithium-manganese-rich layered oxide cathode material precursor, may be calcined in air. During calcination, preferably all organic material, such as acetates, that may be present in the precipitate is burnt off.

The precipitate may be pre-treated at a temperature between about 200° C. and about 700° C., e.g. about 600° C.

The precipitate may be calcined for a period of between about 2 hours and about 10 hours, e.g. about 3 hours.

Annealing of the calcined material may be effected at a temperature which is sufficiently high to crystallize the material. The annealing may be effected for a period of time which is long enough to achieve a desired degree of annealing, i.e. to achieve a desired degree of crystallinity. The annealing may be done in air.

The calcined material may be annealed at a temperature between about 600° C. and about 1000° C., preferably between about 800° C. and about 1000° C., e.g. about 900° C.

The calcined material may be annealed for a period of between about 2 hours and about 24 hours, e.g. about 12 hours.

The aqueous solution, during co-precipitation of the dissolved Li compound and the dissolved Mn salt, typically has a pH greater than 7. Preferably, the pH is greater than 9, more preferably between 9.5 and 10.5, e.g. about 10. When the precipitator which reacts at least with the dissolved Mn salt to form a carbonate is a base, the pH of the aqueous solution may be adjusted by addition of excess precipitator, e.g. excess urea.

In one embodiment of the invention, urea at a molar ratio as a 1.2, 1.6 or 1.8 multiple of a stoichiometric ratio is used.

Instead, a stoichiometric amount of the precipitator may be used.

When the dissolved Li compound is LiOH, the process may include dissolving the LiOH and the precipitator, which reacts at least with the Mn salt to form a carbonate, together in water to form a first solution, and adding a second solution with the dissolved Mn salt, and preferably with at least one further dissolved salt of a metal M as hereinbefore described, to the first solution to form said aqueous solution and to effect co-precipitation.

Thus, the process may include dissolving the LiOH and the precipitator, which reacts at least with the Mn salt to form a carbonate, together in water to form a first solution, and adding a second solution with the dissolved Mn salt, and with at least one further dissolved salt, selected from the group consisting of an acetate, a nitrate, a sulfate, and mixtures thereof, of a metal M selected from the group consisting of Ni, Co, Fe, Al, Mg, Ti, and two or more of these, to the first solution to form said aqueous solution and to effect co-precipitation.

The process may include separating the precipitate from the aqueous solution, e.g. by filtration or evaporation of the water. In at least one embodiment of the invention, evaporation of the water is preferred.

In one embodiment of the invention, the lithium-manganese-rich layered oxide cathode material is $Li_{1.2}Mn_{0.6}Ni_{0.2}O_2$.

The invention extends to a lithium-manganese-rich layered oxide cathode material or a lithium-manganese-rich layered oxide cathode material precursor when produced by the process as hereinbefore described.

According to a further aspect of the invention, there is provided an electrochemical cell, which includes
a cell housing; and
a cathode, an anode and an electrolyte in the cell housing,
in which the cathode is electrically insulated from the anode but electronically coupled thereto by the electrolyte, the cathode including a lithium-manganese-rich layered oxide cathode material produced by the process as hereinbefore described.

According to another aspect of the invention, there is provided a method of making an electrochemical cell which includes loading, into a cell housing, an electrolyte, an anode, a separator and a cathode, with the cathode including a lithium-manganese-rich layered oxide cathode material produced by the process as hereinbefore described.

The electrochemical cell with the lithium-manganese-rich layered oxide cathode material may have an initial discharge capacity of at least about 200 mA h $g^{-1}$, or at least about 240 mA h $g^{-1}$, or at least about 260 mA h $g^{-1}$, e.g. about 266 mA h $g^{-1}$, at a current density of 20 mA/g.

The electrochemical cell may show capacity retention of more than 95%, or more than 96%, or more than 97%, at a current density of 20 mA/g, after 30 cycles.

According to still a further aspect of the invention, there is provided a method of operating an electrochemical cell, which method includes
applying a charging potential to the electrochemical cell as hereinbefore described thereby causing lithium from the cathode to form at least part of the anode; and
permitting the discharging potential of the cell to reach 2.0-3.5 V vs. lithium metal, and with the average manganese valence state being about 3.5+ or higher during charge and discharge of the cell.

The charging potential of the cell may be permitted to reach 4.5-5.1 V vs lithium metal. The average manganese valence state may be about 3.8+ or higher during charge and discharge of the cell.

Figure 2:
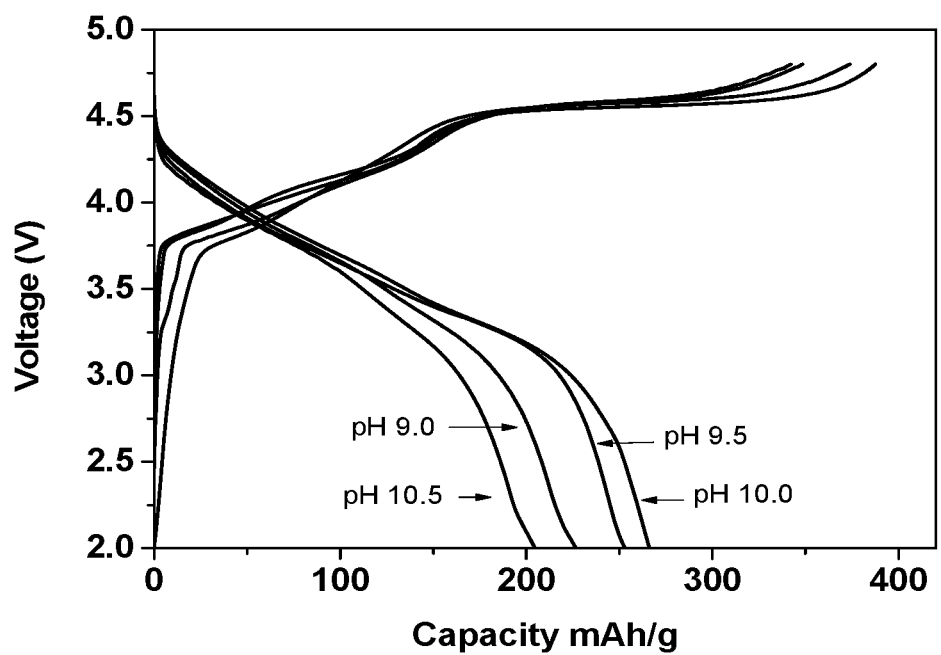
Figure 3:
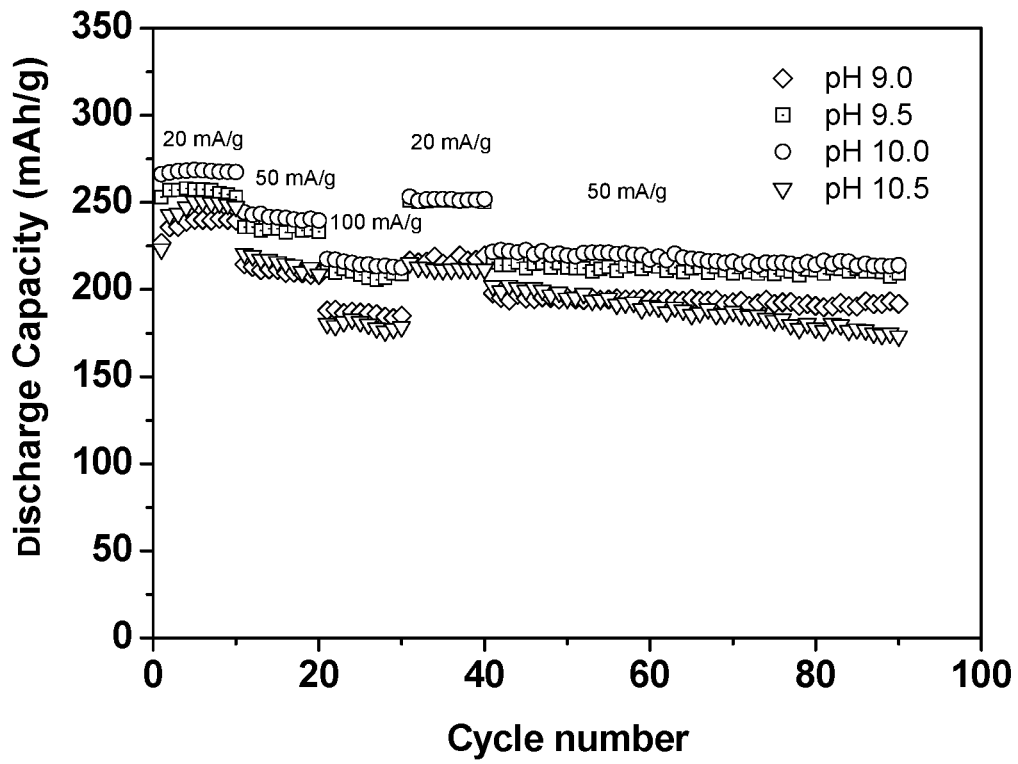
Figure 4:
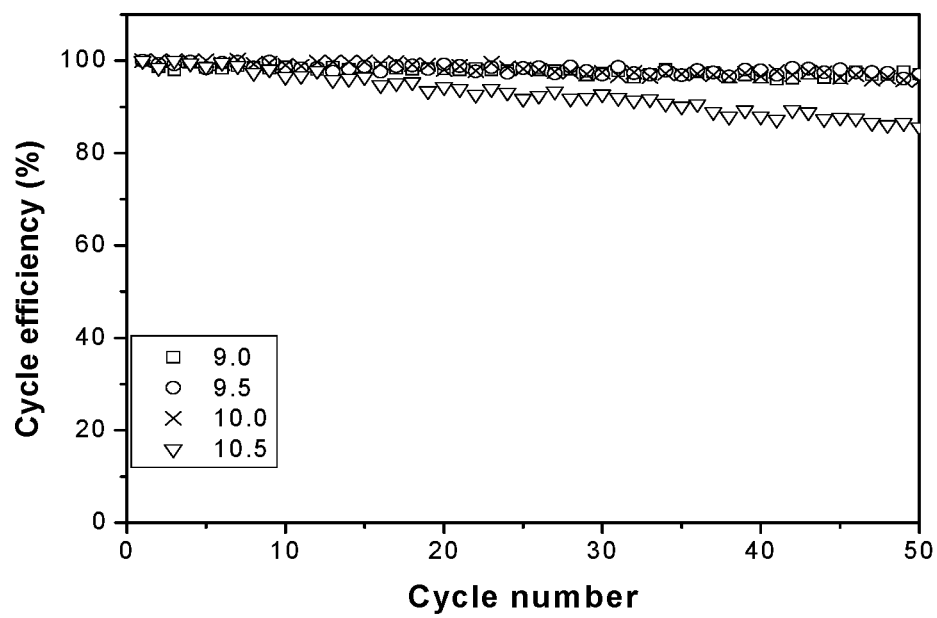

The invention is now described in more detail with reference to the following example and the accompanying diagrammatic drawings in which FIG. 1 shows powder XRD patterns of $Li_{1.2}Mn_{0.6}Ni_{0.2}O_2$ cathode materials prepared in accordance with the process of the invention from four aqueous solutions each with a different pH;

FIG. 2 shows first charge/discharge voltage profiles of $Li_{1.2}Mn_{0.6}Ni_{0.2}O_2$ cathode materials prepared in accordance with the process of the invention from four aqueous solutions each with a different pH, charged between 2.0 V and 4.8 V at a rate of 0.1 C (20 mA/g current density);

FIG. 3 shows graphs of rate performances of $Li_{1.2}Mn_{0.6}Ni_{0.2}O_2$ cathode materials prepared in accordance with the process of the invention from four aqueous solutions each with a different pH, discharged at 20 mA/g, 50 mA/g and 100 mA/g in the voltage range 2.0 V to 4.8 V for 10 cycles and further cycling performance at 50 mA/g for 50 cycles; and FIG. 4 shows graphs of cycling efficiency over 50 cycles for $Li_{1.2}Mn_{0.6}Ni_{0.2}O_2$ cathode materials prepared in accordance with the process of the invention from four aqueous solutions each with a different pH, discharged at 50 mA/g.

EXAMPLE

A facile one-pot co-precipitation synthesis method or process in accordance with the invention was employed to produce the lithium-manganese-rich metal oxide cathode material $Li_{1.2}Mn_{0.6}Ni_{0.2}O_2$. Stoichiometric ratios of Li:Mn:Ni were kept fixed for the desired $Li_{1.2}Mn_{0.6}Ni_{0.2}O_2$ layered material, while urea as a precipitator was varied from 1.0 to 1.8 times the required stoichiometric ratio, resulting in four batches of $Li_{1.2}Mn_{0.6}Ni_{0.2}O_2$ produced from aqueous solutions that varied in pH, respectively of pH 9.0 (1.0×the stoichiometric urea ratio), pH 9.5 (1.2×the stoichiometric urea ratio), pH 10.0 (1.6×the stoichiometric urea ratio) and pH 10.5 (1.8×the stoichiometric urea ratio). The synthesis procedure involved dissolving appropriate stoichiometric amounts of manganese acetate tetrahydrate [$Mn(CH_3COO)_2 \cdot 4H_2O$] and nickel acetate tetrahydrate [Ni $(CH_3COO)_2 \cdot 4H_2O]$ in distilled water, in a first beaker. Lithium hydroxide [$LiOH \cdot H_2O$] and urea [$CO(NH_2)_2$] were dissolved, separately from the $Mn(CH_3COO)_2 \cdot 4H_2O$ and $Ni(CH_3COO)_2 \cdot 4H_2O$, in deionized water in a second beaker to form a base solution.

The solutions in both beakers were stirred at 1000 rpm at 70° C. until completely dissolved (dissolved in 10 minutes). The metal ions acetate solution in the first beaker was then introduced dropwise to the base solution in the second beaker while stirring at 1000 rpm at 70° C. The aqueous solution in the second beaker changed in colour gradually to dark brown as a suspension with a suspended precipitate formed. The suspension was then left stirring at 70° C. for a period of time, whereafter the water was evaporated at 100° C. A fine brown/reddish powder was obtained, which was calcined in a first heating step at about 600° C. for 2 hrs (with a temperature increase rate of 5° C. $min^{-1}$) in an air flowing furnace to burn off all the acetates/organics. A $2^{nd}$ heating step, i.e. an annealing step, was done at a higher temperature of about 900° C., for a period of about 12 hours, to promote the formation of the final desired crystalline phase.

Physicochemical information was attained using X-ray diffraction (XRD), Scanning Electron Microscopy (SEM), the Brunauer-Emmett-Teller (BET) method and a Maccor battery tester (for electrochemistry information). The physical properties of the four produced materials did not differ much according to XRD, SEM and BET (see FIG. 1, which shows the XRD patterns for the four materials). The four lithium-manganese-rich metal oxides produced were similar to those reported in literature. As seen in FIG. 1, the XRD patterns for the four $Li_{1.2}Mn_{0.6}Ni_{0.2}O_2$ oxides are all similar and are indexed to the layered structure that was reported in literature. The material is in each instance a mixture of a cubic and a monoclinic crystal structure. Rietveld refinement shows that their compositions are 90.1%, 93.4%, 94.2% and 94.3% monoclinic for material produced from aqueous solutions having a pH 9, a pH 10.5, a pH 9.5 and a pH 10.0 respectively as shown in FIG. 1.

However, the electrochemistry of these four materials differed significantly.

The four cathode materials were built into coin-cells and displayed exceptional electrochemical performance in delivering more than 200 mA h $g^{-1}$ at a constant current density of 20 mA/g in the voltage range of 2.0 V-4.8 V.

Cathode material obtained by co-precipitation from an aqueous solution with a pH of 10.0 delivered an initial high discharge capacity of 266 mA h $g^{-1}$ at 20 mA/g current density and maintained a discharge capacity of more than 220 mA h $g^{-1}$ at 50 mA/g after 50 cycles, as shown in FIG. 3.

All four cathode materials showed good stability at starting high potentials of 4.8 V. These materials also showed high discharge capacities at potentials >4.5V at 20 mA/g. Upon the first discharge cycle, all four cathode materials suffered capacity loss as expected for $Li_2MnO_3$ based composites and was similar to the results reported by other groups studying these types of composite materials. The large capacity loss during the initial cycle was reported by others to be associated with the complete loss of $Li_2O$ during activation of the $Li_2MnO_3$ component. All electrodes exhibited a sloping voltage profile below 4.4 V, followed by a relatively long plateau around 4.5 V during the first charge process. The sloping voltage profile can be attributed to the oxidation of $Ni^{2+}$ to $Ni^{4+}$ ions in the $LiMn_{0.5}Ni_{0.5}O_2$ component and the 4.5 V plateau voltage profile arises from the simultaneous irreversible removal of $Li^+$ ions and oxygen ($Li_2O$).

The process of the invention produced materials with good performance; the results showed that the cathode material made from an aqueous solution wih a pH of 10.0 had the highest initial charge and discharge capacity of 373 mA h $g^{-1}$ and 266 mA h $g^{-1}$ respectively as shown in FIG. 2.

FIG. 3 shows that the cells made with the various cathode materials all achieved more than 200 mA h $g^{-1}$. The cells also showed good capacity retention properties with about 95% capacity retention at 20 mA/g after 30 cycles (See FIG. 4). From FIG. 3 it is evident that capacity decreases steadily with increasing current densities. Materials produced from an aqueous solution with a pH of 9.5 or a pH of 10.0 further delivered >200 mA h $g^{-1}$ capacity even when charged with 100 mA/g current density and the cathode materials delivered stable capacity even at higher current densities.

All four homogenous lithium-manganese-rich metal oxide cathode materials produced displayed steady cycling at high potentials and good rate performance, suggesting that they are promising candidates for use in high capacity lithium-ion battery applications.

The process of the invention, which can be described as a facile one-pot co-precipitation synthesis method, can be used for producing a lithium-manganese-rich layered oxide cathode material or a lithium-manganese-rich layered oxide cathode material precursor. Advantageously, the process is fast and uses an inexpensive precipitator such as urea, which can be used in various ratios to produce cathode materials with different electrochemical properties. In at least one embodiment of the invention, as illustrated, the need for filtration and washing is avoided, which can potentially save water.

The invention claimed is:

1. A process for producing a lithium-manganese-rich layered oxide cathode material or a lithium-manganese-rich layered oxide cathode material precursor, the process comprising:

co-precipitating a dissolved Li compound and a dissolved Mn salt selected from a group consisting of $Mn(CH_3COO)_2$, $Mn(NO_3)_2$, $MnSO_4$, and mixtures thereof, from an aqueous solution, in the presence of a precipitator which reacts at least with the dissolved Mn salt to form a carbonate, thereby providing a precipitate which includes $MnCO_3$ and a lithium compound as a lithium-manganese-rich layered oxide cathode material precursor, wherein the dissolved Li compound is LiOH, and wherein the process comprises:

dissolving the LiOH and the precipitator together in water to form a first solution, and adding a second solution with a dissolved Mn salt selected from a group consisting of $Mn(CH_3COO)_2$, $Mn(NO_3)_2$, $MnSO_4$, and mixtures thereof, and with at least one further dissolved salt, selected from a further associated group consisting of an acetate, a nitrate, a sulfate, and mixtures thereof, of a metal M selected from a further group consisting of Ni, Co, Fe, Al, Mg, Ti, and two or more of these, to the first solution to form said aqueous solution and to effect co-precipitation.

2. The process according to claim 1, wherein the process includes
- calcining the precipitate to convert any carbonate material to oxide material, thereby providing a calcined material; and
- annealing the calcined material to provide a lithium-manganese-rich layered oxide cathode material.

3. The process according to claim 2, wherein the precipitator is selected from a group consisting of urea, $(NH_4)_2CO_3$, $NH_4HCO_3$, and mixtures thereof.

4. The process according to claim 1, wherein the precipitator is selected from a group consisting of urea, $(NH_4)_2CO_3$, $NH_4HCO_3$, and mixtures thereof.

5. The process according to claim 1, wherein the aqueous solution, during co-precipitation of the dissolved Li compound and the dissolved Mn salt, has a pH greater than 7.

6. The process according to claim 1, wherein the lithium-manganese-rich layered oxide cathode material is $Li_{1.2}Mn_{0.6}Ni_{0.2}O_2$.

7. The process according to claim 1, wherein the aqueous solution, during co-precipitation of the dissolved Li compound and the dissolved Mn salt, has a pH greater than 9.

8. The process according to claim 1, wherein the aqueous solution, during co-precipitation of the dissolved Li compound and the dissolved Mn salt, has a pH between 9.5 and 10.5.

* * * * *